Figure 1:
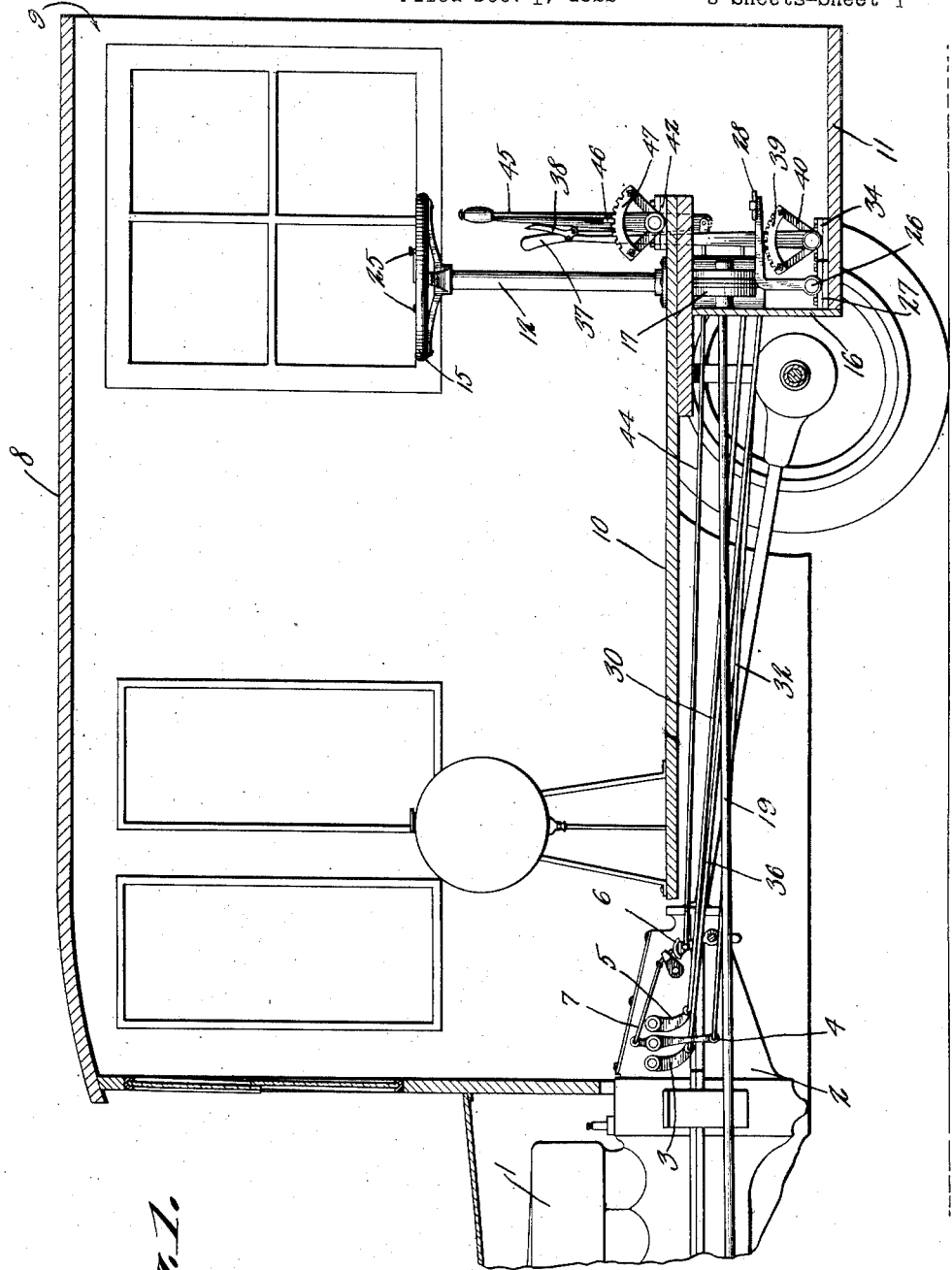

Aug. 24, 1926.

J. H. BUTLER 1,597,342

VEHICLE CONTROL

Filed Dec. 1, 1922    3 Sheets-Sheet 1

Inventor,
J. H. Butler.
By C. A. Snow & Co.
Attorneys

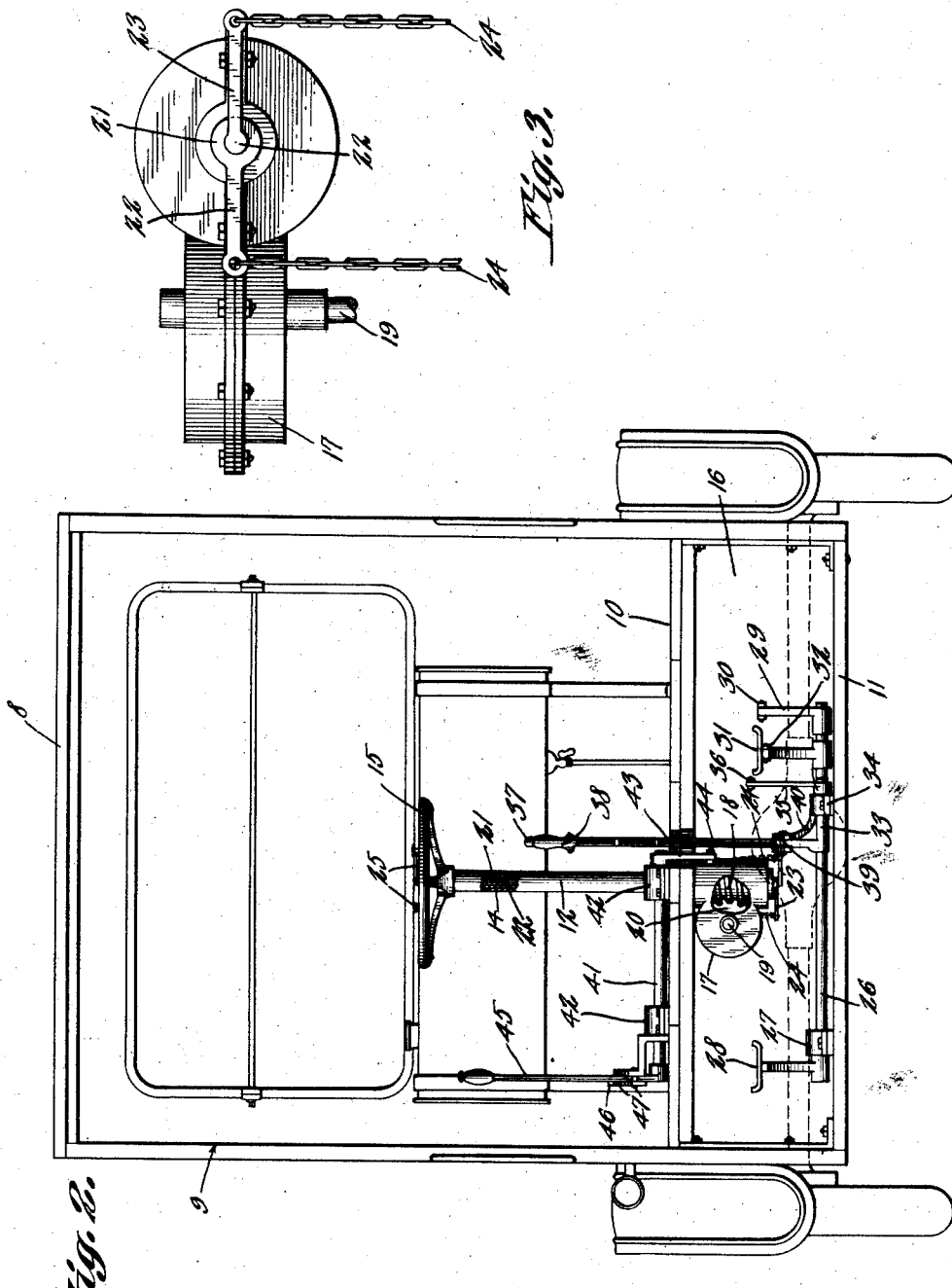

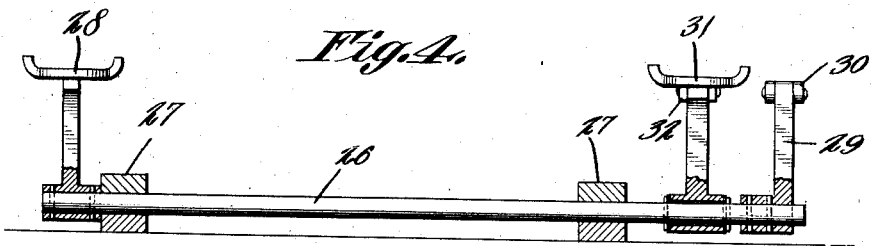
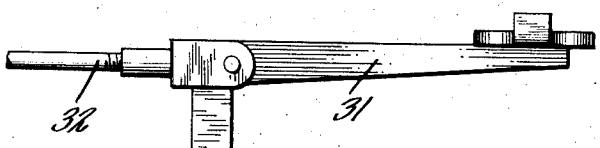
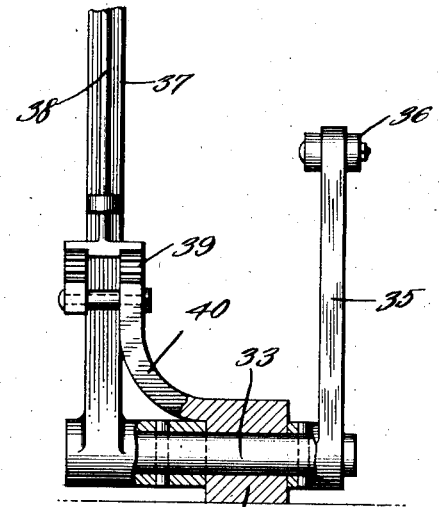
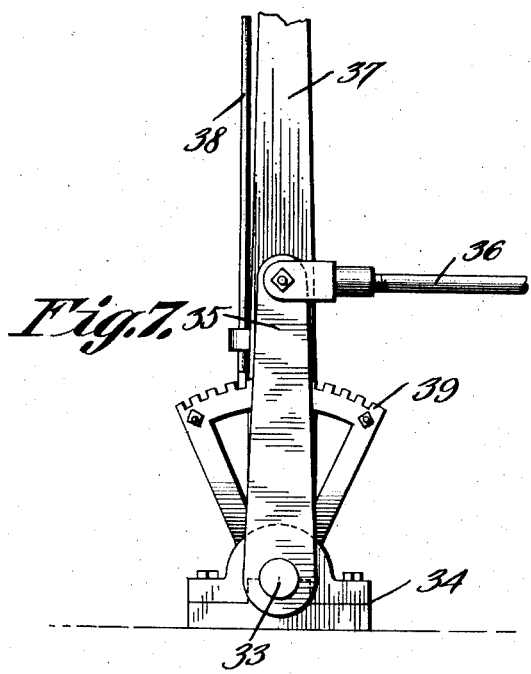

Patented Aug. 24, 1926.

1,597,342

UNITED STATES PATENT OFFICE.

JAY H. BUTLER, OF NEWARK, OHIO.

VEHICLE CONTROL.

Application filed December 1, 1922. Serial No. 604,349.

This invention aims to provide a simple means whereby an automobile of any desired construction, usually operated from a forward seat, may be operated from a point at the rear of the body of the vehicle, whereby enabling the automobile to be used readily as a delivery truck.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in elevation, a device constructed in accordance with the invention, parts appearing in section; Figure 2 is a rear elevation; Figure 3 is a plan showing a portion of the steering mechanism; Figure 4 is an elevation showing the means whereby the reversing mechanism and the clutch are operated from the rear of the vehicle; Figure 5 is an elevation showing the clutch pedal; Figure 6 is an elevation disclosing the service brake lever and attendant parts, which are located at the rear of the vehicle; and Figure 7 is an elevation wherein the structure depicted in Figure 6 is viewed at right angles to the showing of that figure.

The numeral 1 marks the engine of a Ford automobile, the transmission casing appearing at 2. The numeral 3 designates an arm whereby the service brake is controlled. The clutch arm is shown at 4. The reverse arm appears at 5. The numeral 6 designates an arm whereby the emergency brake is applied. The numeral 7 designates means whereby, when the emergency brake is applied, the clutch is thrown out—all as usual.

The vehicle comprises a body 8 which is open at its rear end, as shown at 9, the body including a floor 10, a partition 16 depending therefrom, and a depressed platform 11 projecting rearwardly from the partition, the platform constituting a place whereon the operator of the vehicle may stand conveniently.

A steering column 12 is mounted on the floor 10 adjacent to the rear end thereof. A shaft 14 is journaled in the column 12. There is a hand wheel 15 on the upper end of the shaft 14, the hand wheel being located within easy reach of a person standing on the platform 11. A casing 17 is mounted on the floor 10 and the partition 16 and is located beneath the floor at the rear end thereof. A worm 18 is secured to the lower end of the shaft 14 and is housed in the casing 17. A shaft 19 is journaled in the casing 17 and is extended forwardly, so that it may be connected to the steering mechanism (not shown) of the vehicle. A worm wheel 20 is secured to the shaft 19 and is located in the casing 17, the worm wheel meshing with the worm 18.

From the foregoing, it will be obvious that, through the instrumentality of the hand wheel 15, the shaft 14, the worm 18, the worm wheel 20 and the shaft 19, the steering of the vehicle may be brought about by a person standing on the platform 11.

A shaft 21 is journaled in the shaft 14. A shaft 22 is journaled in the shaft 21. At their lower ends, the shafts 22 and 21 are provided with arms 23. Flexible elements 24 are connected to the arms 23 and are lead forwardly, the flexible elements being connected with the spark control and with the gasoline supply. The shafts 21 and 22 are supplied at their upper ends with levers 25 disposed above the hand wheel 15.

Clearly, by means of the levers 25, the shafts 21 and 22, the arms 23 and the flexible elements 24, the engine may be throttled, and the spark may be advanced or retarded, from the rear end of the body 8.

A shaft 26 is mounted to rock in bearings 27 on the platform 11. At one end, the shaft 26 is provided with a first pedal 28. A first arm 29 is fixed to the other end of the shaft 26. A link 30 is pivoted to the arm 29 on the shaft 26 and is pivoted to the reverse arm 5.

The car may be put into reverse from the rear end thereof, by a train of elements comprising the pedal 28, the shaft 26, the arm 29, the link 30 and the arm 5.

A second pedal 31 is mounted to swing on the shaft 26. The rear end of a link 32 is pivoted to the pedal 31. The forward end of the link 32 is pivoted to the clutch arm 4.

Through the instrumentality of the pedal 31, the link 32 and the arm 4, the clutch may be operated from the rear end of the vehicle.

As shaft 33 is mounted to rock in a bearing 34 on the platform 11. At one end, the shaft 33 is supplied with an upstanding arm 35. The rear end of a link 36 is pivoted to the arm 35. The forward end of the link 36 is pivoted to the arm 3 which controls the service brake. A second lever 37 is fixed to the shaft 33. The lever 37 has a latch mechanism 38 adapted to cooperate with a segment 39 carried by a bracket 40 projecting from the bearing 34.

The service brake may be applied, from the rear end of the vehicle, through a train of elements including the lever 37, the shaft 33, the arm 35, the link 36 and the arm 3.

A shaft 41 is mounted to rock in bearings 42 on the floor 10. At one end, the shaft 41 has a depending arm 43. The rear end of a link 44 is pivoted to the arm 43. The forward end of the link 44 is pivoted to the emergency brake arm 6. A first lever 45 is secured to the shaft 41 and has a latch mechanism 46 adapted to cooperate with a segment 47 mounted on a bracket 48 carried by one of the bearings 42.

The emergency brake mechanism may be operated from the rear of the vehicle by a train of elements comprising the lever 45, the shaft 41, the arm 43, the link 44 and the arm 6.

From the foregoing it will be clear that all of the operating means usually manipulated from the forward end of a Ford car can be manipulated, in the device forming the subject matter of this application, from the rear end of the car, it being necessary for the operator merely to step off the platform 11 when his duties require him to leave the car for the delivery of merchandise or otherwise.

What is claimed is:—

In a vehicle, a rear platform, and a floor located at a higher elevation than the platform, the floor extending forwardly with respect to the platform and having a part overhanging a portion of the platform, bearings on said portion of the platform and located beneath the overhanging part of the floor, a shaft extended transversely of the platform and journaled in the bearings, a first arm on one end of the shaft, a first pedal secured to the other end of the shaft, a second pedal mounted to swing on the intermediate portion of the shaft, the first arm and the first and second pedals being located mostly beneath the overhanging part of the floor, first and second hand levers extended above the overhanging part of the floor, means for fulcruming the first hand lever on the overhanging part of the floor, means for fulcruming the second hand lever on said portion of the platform; controlling mechanism for the vehicle and located near to the forward end thereof, the controlling mechanism including a reversing member, a clutch-operating member, an emergency brake mechanism, and a service brake; means for connecting the reversing member with the first arm, means for connecting the second pedal with the clutch-operating member, means for connecting the first hand lever with the emergency brake mechanism, and means for connecting the second hand lever with the service brake.

In testimony that I claim the foregoing as my own, I have hereto affixed my signature.

JAY H. BUTLER.